United States Patent
Bawcom et al.

(10) Patent No.: US 8,805,875 B1
(45) Date of Patent: Aug. 12, 2014

(54) SYSTEMS AND METHODS FOR INFORMATION RETRIEVAL

(75) Inventors: Aaron N. Bawcom, Atlanta, GA (US); Christopher M. Madden, Alpharetta, GA (US); Michael C. Wronski, Johns Creek, GA (US)

(73) Assignee: Reflex Systems LLC, Atlanta, GA (US)

( * ) Notice: Subject to any disclaimer, the term of this patent is extended or adjusted under 35 U.S.C. 154(b) by 318 days.

(21) Appl. No.: 12/573,587

(22) Filed: Oct. 5, 2009

Related U.S. Application Data

(60) Provisional application No. 61/102,823, filed on Oct. 4, 2008.

(51) Int. Cl.
*G06F 17/30* (2006.01)

(52) U.S. Cl.
CPC ............. *G06F 17/30545* (2013.01); *G06F 17/30566* (2013.01)
USPC .................... 707/770; 707/803; 707/718

(58) Field of Classification Search
None
See application file for complete search history.

(56) References Cited

U.S. PATENT DOCUMENTS

| | | | |
|---|---|---|---|
| 5,905,982 A | 5/1999 | Carey | |
| 6,253,195 B1 * | 6/2001 | Hudis et al. | 707/713 |
| 6,421,662 B1 | 7/2002 | Karten | |
| 6,742,175 B1 | 5/2004 | Brassard | |
| 7,035,846 B2 | 4/2006 | Gupta | |
| 7,284,245 B2 * | 10/2007 | Novik et al. | 719/310 |
| 7,299,171 B2 | 11/2007 | Ta | |
| 7,539,667 B2 | 5/2009 | Lindsay | |
| 7,644,064 B2 | 1/2010 | Eppley | |
| 7,774,485 B2 * | 8/2010 | Patrick et al. | 709/229 |
| 7,827,523 B2 * | 11/2010 | Ahmed et al. | 717/106 |
| 7,917,547 B2 | 3/2011 | Hughes | |
| 7,941,460 B2 * | 5/2011 | Bar-Or et al. | 707/803 |
| 7,984,043 B1 * | 7/2011 | Waas | 707/718 |
| 8,046,352 B2 | 10/2011 | Basu | |
| 8,060,516 B2 | 11/2011 | Weissman | |
| 8,078,609 B2 | 12/2011 | Black | |

(Continued)

OTHER PUBLICATIONS http://esper.codehaus.org/, retreived from web.archive.org, archived Sep. 16, 2009 (89 pages).

(Continued)

*Primary Examiner* — Richard Bowen
(74) *Attorney, Agent, or Firm* — DLA Piper LLP US

(57) ABSTRACT

An information retrieval system implements a search language, through which a querying entity (e.g., a user, a program or process, or the like) formulates a search query. Preferably, a search query is composed of an ordered set of clause definitions, and each clause can have set membership operations applied to it. Each clause includes a clause pipeline, and a time constraint. A clause pipeline includes an ordered set of clause specifications separated by a pipeline operator. A clause specification can be either an expansion operation or a filtering operation. Preferably, a first clause specification in a pipeline operates on an initial universe of all objects, and each subsequent clause specification operates on a set of objects produced from the previous clause specification. The search language is exposed to users (typically, IT administrators), and one or more builder programs within the system (each referred to as a "model builder") are used internally to present data models to the search language. A model builder extracts data from a given type of data source (including, without limitation, a relational database system, an application programming interface (API), or the like), and enables that data to be presented to one or more constructs of the search language according to a single unified data model.

14 Claims, 7 Drawing Sheets

(56) References Cited

U.S. PATENT DOCUMENTS

| | | | |
|---|---|---|---|
| 8,204,903 B2 | 6/2012 | Bowers | |
| 2003/0041142 A1 | 2/2003 | Zhang et al. | |
| 2004/0059719 A1 | 3/2004 | Gupta | |
| 2004/0260685 A1* | 12/2004 | Pfleiger et al. | 707/3 |
| 2004/0267760 A1* | 12/2004 | Brundage et al. | 707/100 |
| 2005/0187906 A1 | 8/2005 | Madan | |
| 2005/0198065 A1 | 9/2005 | Eppley | |
| 2005/0210023 A1 | 9/2005 | Barrera | |
| 2006/0005122 A1 | 1/2006 | Lemoine | |
| 2006/0041421 A1 | 2/2006 | Ta et al. | |
| 2006/0089945 A1* | 4/2006 | Paval | 707/102 |
| 2006/0294087 A1 | 12/2006 | Mordvinov | |
| 2007/0050343 A1 | 3/2007 | Siddaramappa | |
| 2007/0061305 A1 | 3/2007 | Azizi | |
| 2007/0071146 A1 | 3/2007 | Scaglione | |
| 2007/0078816 A1 | 4/2007 | Stern | |
| 2007/0299804 A1* | 12/2007 | Liu et al. | 707/1 |
| 2008/0120283 A1* | 5/2008 | Liu et al. | 707/4 |
| 2008/0162409 A1* | 7/2008 | Meijer et al. | 707/2 |
| 2008/0177748 A1* | 7/2008 | Rondot | 707/10 |
| 2008/0301175 A1* | 12/2008 | Applebaum et al. | 707/102 |
| 2009/0024622 A1* | 1/2009 | Chkodrov et al. | 707/6 |
| 2009/0100022 A1* | 4/2009 | Nayak et al. | 707/3 |
| 2009/0319499 A1* | 12/2009 | Meijer et al. | 707/4 |

OTHER PUBLICATIONS http://research.microsoft.com/en-us/projects/dryad/, retreived from web.archive.org, archived Sep. 26, 2009 (13 pages).

U.S. Appl. No. 13/630,634.

Bradley Berg, "The Aurora Project", http://cs.brown.edu/research/aurora/, Dec. 8, 2014 (10 pages), retrieve from web.archive.org, archived Oct. 11, 2008.

http://www.streambase.com/, retreived from web.archive.org, archived Mar. 23, 2009 (46 pages).

http://www.rulecore.com/, retreived from web.archive.org, archived May 26, 2009 (25 pages).

http://www.sqlstream.com/, retreived from web.archive.org, archived Apr. 14, 2009 (96 pages).

http://en.wikipedia.org/wiki/Lexical_analysis, retreived from web.archive.org, archived Sep. 30, 2009 (6 pages).

http://en.wikipedia.org/wiki/Parsing, retreived from web.archive.org, archived Sep. 30, 2009 (7 pages).

http://en.wikipedia.org/wiki/Compiler, retreived from web.archive.org, archived Dec. 19, 2008 (10 pages).

http://en.wikipedia.org/wiki/Process, retreived from web.archive.org, archived Apr. 23, 2009 (2 pages).

http://en.wikipedia.org/wiki/Message_passing, retreived from web.archive.org, archived Mar. 27, 2009 (4 pages).

* cited by examiner

Return all VM's on host "X" a week ago http://servername/Query/hostname=X project vm at 1 week ago Returns the JSON output {"guest": {
 "name": "WebServer1",
 "moref": "guest-123",
 "state" : "on"
 }
}

Which after importing into a python execution engine the following command could be issued:

vm.Shutdown();

All VM's on Host "X" at MM/DD/YYYY
host.name = X project child at 2007/12/01 10:10:45

The VM that was created on MM/DD/YY and was connected to the ZZZ
network
vnic.network = ZZZ project vm | vm.created = 2007/12/01

All VM's that VM "X" is in the same broadcast domain with
vm.name = X project bcast | project vm All security events for VM "X" at time MM/DD/YYYY
vm.name = X project security between 2007/12/01 00:00:00 thru
2007/12/01 23:59:59

All Services seen to VM "Y" at time MM/DD/YYYY
vm.name = Y project services between 2007/12/01 00:00:00 thru
2007/12/01 23:59:59

Throughput of VM "X" at MM/DD/YYYY
vm.name = X project vnic_perf at 2007/12/01 10:10:45

Any objects that include the strings "SQL" and "Server" in any of
their properties
SQL Server Any virtual machines that have ever run SQL Server
SQL Server project vm All virtual machines that were running SQL Server software greater
than version 9.2 two months ago
SQL Server and VersionMajor >= 9 and VersionMinor >= 2 project vm at
8 weeks ago All virtual machines that were running SQL Server, had a VM disk
alarm, and a host disk alarm 1 hour ago
SQL Server project vm in alarm.name = "Host Disk Usage" project vm in
alarm.name = "VM Disk Usage" project vm at 1 hour ago

*FIG. 11*

SYSTEMS AND METHODS FOR INFORMATION RETRIEVAL

This application is based on and claims priority from Ser. No. 61/102,823, filed Oct. 4, 2008.

BACKGROUND OF THE INVENTION

1. Technical Field

This invention relates generally to computer system data retrieval techniques.

2. Background of the Related Art

Information retrieval systems are known in the art. Such systems generally offer users a variety of means of expressing user intentions through queries. These include text search, parametric search, structured queries, selection from alternatives (i.e., browsing or navigation), and range specification. In general, the systems offer users a means of expressing queries using either a structured language (e.g., a language like SQL) or an informal input mechanism (e.g., English keyword search). When the input mechanism is informal, the problems of ambiguity may arise from the language itself. But, even when the input mechanism is formal, the user may not always succeed in expressing his or her intention in the formal query language.

Information Technology (IT) infrastructures can become large and complex, and this creates a need to provide administrators and others with the ability to query, display, and manipulate their operation in a timely manner. In particular, both experienced and inexperienced users need the ability to quickly find data within the IT infrastructure; likewise, external software programs that can be executed from a programmatic environment need the ability to quickly find specific data based on complex conditions and then output results in an object-oriented structured form.

Several organizations have attempted to provide a query language for IT infrastructure including the Distributed Management Task Force (DMTF) CIM Schema definitions, Microsoft Corporation's SQL for WMI (WQL), the Splunk search language, the Hyper9 natural language, HQL, and other XQuery based language representations. These languages have one or more deficiencies. They are narrowly defined for a specific vendor implementation, they do not provide domain specific capabilities, they are overly focused on natural language or structured queries, as the case may be, or they are so broad and verbose that they are only suited for programmatic execution (as opposed to, for example) execution from a simple command line. These existing languages also can require special programming expertise, and they may use rigid language constructs that do not allow for domain level data interpretation.

BRIEF SUMMARY

The subject matter of this disclosure provides for enhanced information retrieval, e.g., in an IT infrastructure information retrieval system. In one embodiment, the techniques provide the ability to produce query results based on codification of IT infrastructure with complex relationships, even where the user has only minimal knowledge of the environment.

The information retrieval system implements a search language, through which a querying entity (e.g., a user, a program or process, or the like) formulates a search query. Preferably, a search query is composed of an ordered set of clause definitions, and each clause can have set membership operations applied to it. Each clause includes a clause pipeline, and a time constraint. A clause pipeline includes an ordered set of clause specifications separated by a pipeline operator. A clause specification can be either an expansion operation or a filtering operation. Preferably, a first clause specification in a pipeline operates on an initial universe of all objects, and each subsequent clause specification operates on a set of objects produced from the previous clause specification.

The search language is exposed to users (typically, IT administrators), and one or more builder programs within the system (each referred to as a "model builder") are used internally to present data models to the search language. A model builder extracts data from a given type of data source (including, without limitation, a relational database system, an application programming interface (API), or the like), and enables that data to be presented to one or more constructs of the search language according to a single unified data model. Thus, the model builder functions as an abstraction layer, which can be used to introduce new objects, relationships and properties to the search mechanism without modifying the search language itself. Object relationships either can be encoded as facts in the underlying model or can be derived from facts within the model builder itself. Expansion operations in the query remove the complexity of object navigation by using the object schema provided by model builders to traverse an object graph for desired objects. Filtering operations in the query use standard grouping Boolean logic for object property comparisons. Preferably, the language need not include any type information for objects but instead provides operators that the model builders map to native object type operations to produce results.

A query system that implements the search language comprises a parser, a lexical analyzer, an abstract syntax tree, and one or more model builders. When a user issues an on-demand query to the query system, the processing of the query is distributed across multiple model builders for the purpose of data correlation and improving query performance. Moreover, because model builders can provide data from any data source, the system can also provide query specifications to a model builder that processes streaming data (as opposed to mere static data or data that is retrieved on-demand). Thus, the language can specify a single query across multiple model builders to simultaneously provide query results from a static model builder, a dynamic model builder, and a streaming model builder. In this way, the language correlates data from multiple data sources into a single unified data model.

More generally, the disclosed system provides for a domain-specific language to map abstract data structures into different specific data types of varying composition and then into a format that is known and can be utilized by an application program (such as a data query and retrieval system). The language provides natural language expressions and default contextual type conversions to handle a full range of user-based queries for a given environment, a virtualized IT infrastructure being just one non-limiting example.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 11 is a set of representative examples of requests for desired information and, for each request, the query string that is used to generate the desired results using the techniques described herein.

DETAILED DESCRIPTION OF AN ILLUSTRATIVE EMBODIMENT

The following definitions apply to components of the system:

A "query" is a string of characters representing data;

An "abstract syntax tree" is a graph of data nodes that represent a parsed structure of a query;

A "query processor" refers to iterations of the abstract syntax tree to produce query results;

A "compiler" is a set of software components that translate a query into an abstract syntax tree;

A "model builder" is a software component that conforms to a defined interface to the query processor for the purpose of providing data from a specific type of data source;

A "query system" is a collection of components that perform data retrieval.

Figure 1:
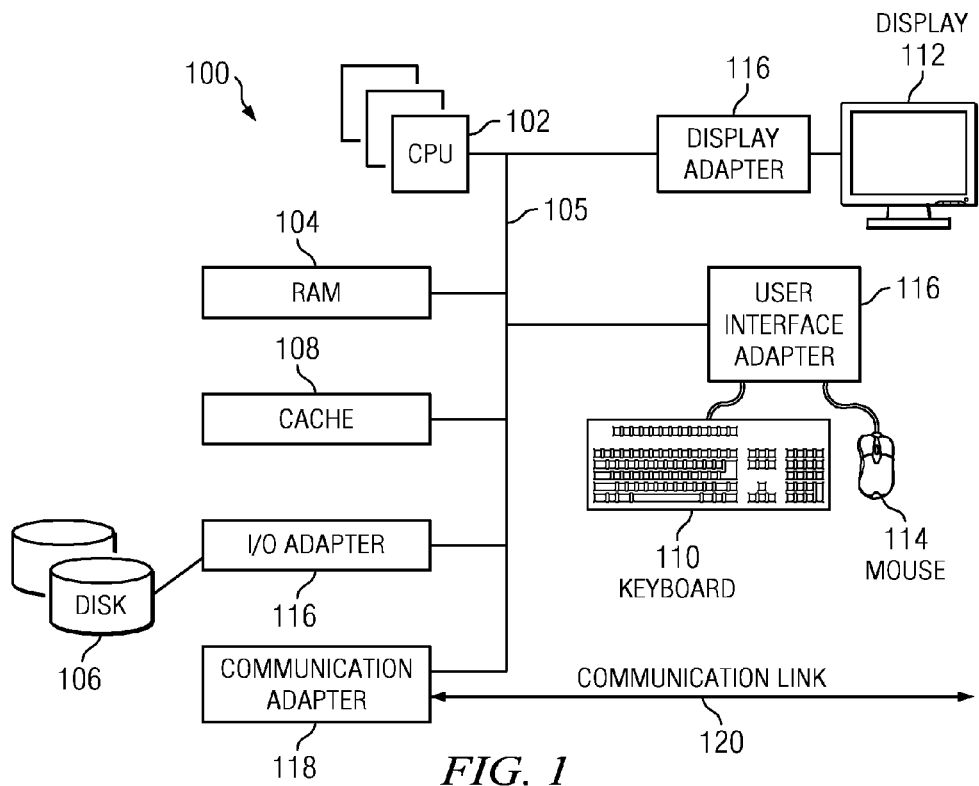
FIG. 1 is an exemplary block diagram of a data processing environment in which exemplary aspects of the illustrative embodiments may be implemented.

FIG. 1 is a simplified block diagram of a representative information retrieval system in which the subject matter described herein may be implemented and comprises a data processing system. As seen in FIG. 1, a data processing system 100 suitable for storing and/or executing program code will include at least one processor 102 coupled directly or indirectly to memory elements through a system bus 105. The memory elements can include local memory 104 employed during actual execution of the program code, bulk storage 106, and cache memories 108 that provide temporary storage of at least some program code to reduce the number of times code must be retrieved from bulk storage during execution. Input/output or I/O devices (including but not limited to keyboards 110, displays 112, pointing devices 114, etc.) can be coupled to the system either directly or through intervening I/O controllers 116. Network adapters 118 may also be coupled to the system to enable the data processing system to become coupled to other data processing systems or devices through intervening private or public networks 120.

In some embodiments, the techniques described herein may task the limitations of a single computational server's resources, and thus it is contemplated that one or more process steps or functions may be distributed onto a set or hierarchy of multiple computational servers. Of course, any other hardware, software, systems, devices and the like may be used. More generally, the subject matter described herein may be implemented with any collection of one or more autonomous computers (together with their associated software, systems, protocols and techniques) linked by a network or networks.

A representative information retrieval system in which the disclosed subject matter may be implemented comprises a set of computer resources (typically, software processes, programs, utilities and associated interfaces, data and protocols) to provide a monitoring and reporting tool for IT system administrators and that includes a search capability. Preferably, the tool has the capability of consolidating logs, metrics and other data from various applications, servers and network devices into a searchable repository and can be used to generate graphs, reports, and alerts, and to take other actions. The information retrieval system helps administrators to identify anomalies and to diagnosis problems in the infrastructure. The tool may have the ability to correlate log files across systems and software components, and such data can help users determine root causes when problems arise within the infrastructure. The described subject matter may be implemented within the information retrieval system, or as an adjunct to that system. In one particular implementation, the IT infrastructure is a virtualized infrastructure, such as the Virtualization Management Center™ (VMC) solution available from Reflex Systems, LLC, of Atlanta, Ga. VMC enables next generation data centers to enforce IT policies, ensure compliance with government mandates and protect virtual servers, desktops, and networks across multiple platforms. In particular, VMC provides a single authoritative visual interface, central management and security for heterogeneous virtual environments. By combining a centralized event database, virtual infrastructure integration and analysis engines with a robust visual interface, VMC enables the user to administer, audit, secure and monitor complex, dynamic, virtual infrastructures. This results in better network and event visibility for a faster and more efficient management and security response.

Figure 2:
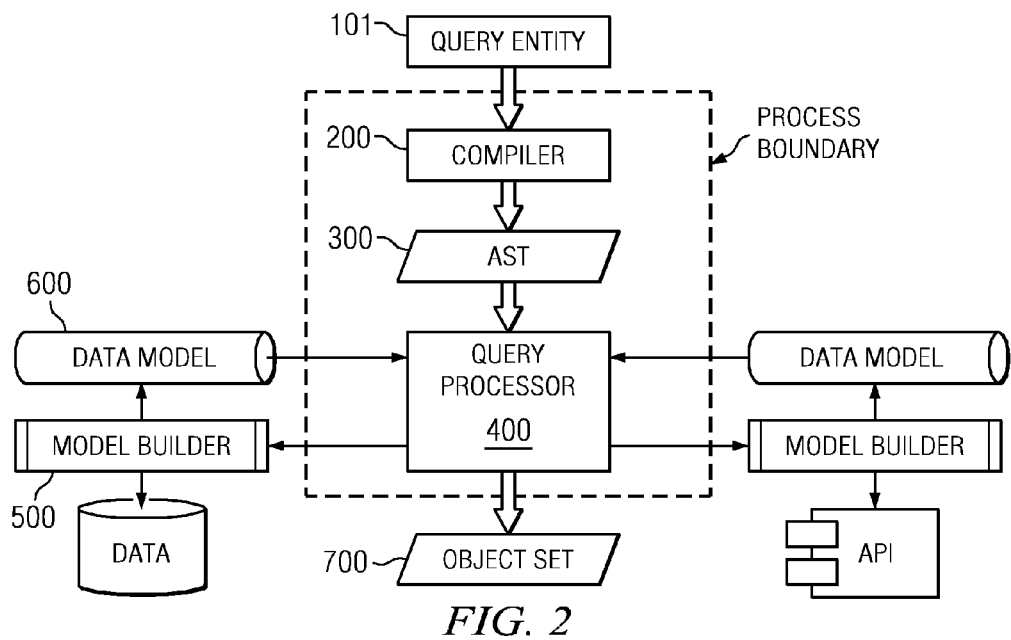
FIG. 2 is a data flow diagram of the subject matter described herein.

FIG. 2 is a data flow diagram illustrating the basic components and operation of an information retrieval system and method according to this disclosure. A query entity 101 (which need not be part of the system itself) formulates a query (basically a string of characters) and supplies it to the information retrieval system. The system comprises compiler 200, abstract syntax tree 300, query processor 400, and one or more model builders 500. The querying entity may be a user, a program or process, or the like. Each model builder 500 generates an associated data model 600, and the data models are mapped to a uniform data model. The output of the query processor 400 is an object set 700, which is the desired response to the query.

Figure 3:
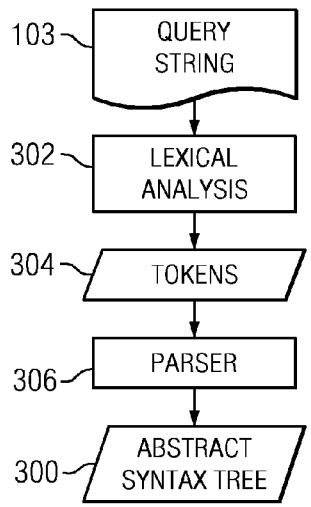
FIG. 3 illustrates the processing steps carried out by the compiler.

The querying entity submits the query to the compiler 200, which may be implemented in the manner shown in FIG. 3. In particular, the compiler 200 performs lexical analysis 302 of the query string 103 based off of a set of lexical constructs (as described below). The lexical analysis produces a set of tokens 304, which are then applied through a parser 306 to generate the abstract syntax tree 300. The compiler may be implemented in any known manner. If desired, the lexical analysis and the parsing may be carried out with just a parser.

Figure 4:
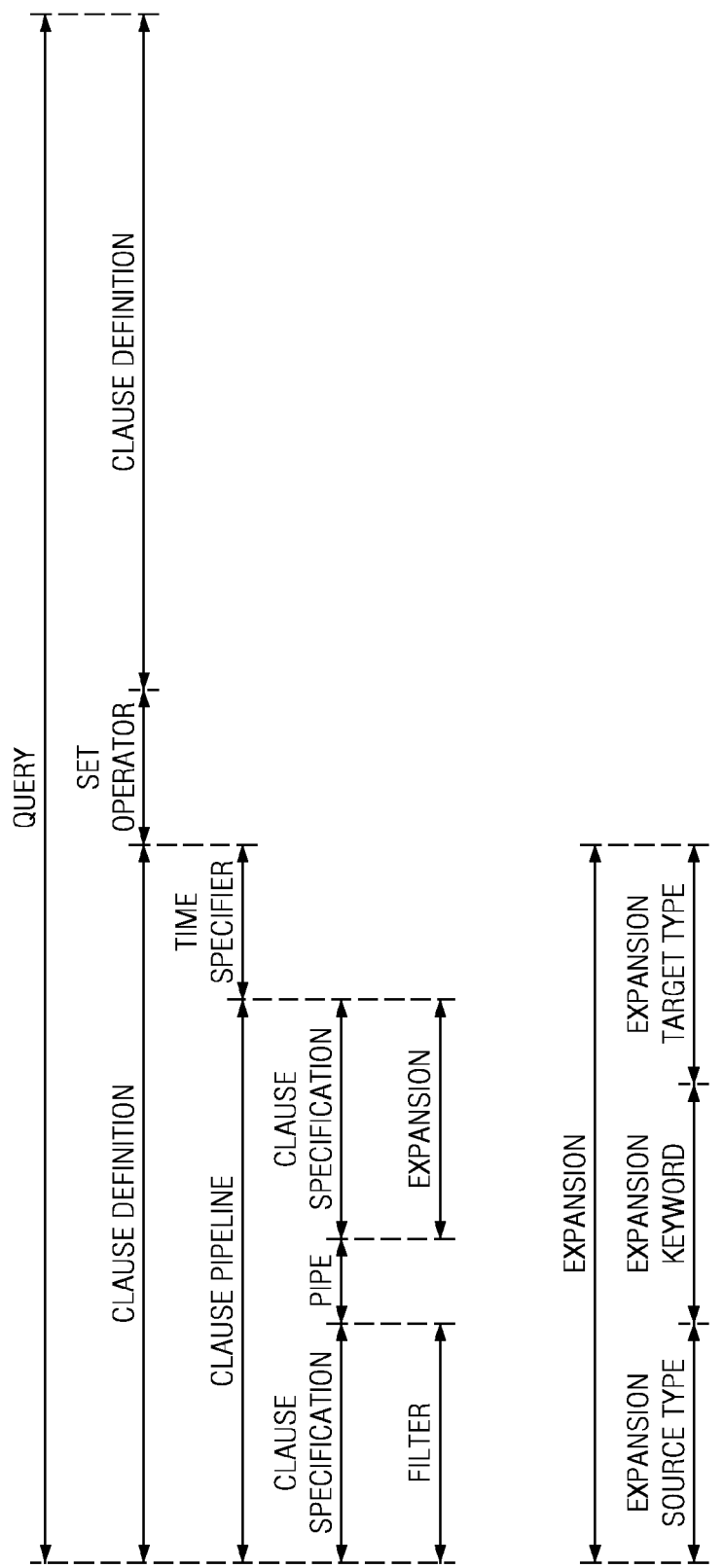
FIG. 4 illustrates a graphical depiction of an abstract syntax tree generated by the compiler.

FIG. 4 is a graphical depiction of the abstract syntax tree 300 generated by the compiler. As can be seen, a search query is composed of an ordered set of clause definitions, and each clause can have set membership operations (the "set operator") applied to it. Each individual clause includes a clause pipeline, and a time constraint (or "specifier"). A clause pipeline includes an ordered set of clause specifications separated by a pipeline operator (or "pipe"). Preferably, a first clause specification in a pipeline operates on an initial universe of all objects, and each subsequent clause specification operates on a set of objects produced from the previous clause specification. Preferably, a clause specification is either a filtering operation or an expansion operation. Filtering operations in the query use standard grouping Boolean logic for object property comparisons. Expansion operations in the query remove the complexity of object navigation by using an object schema provided by model builders to traverse an object graph for desired objects. The expansion operation typically includes an expansion source type, an expansion keyword, and an expansion target type.

Figure 5:
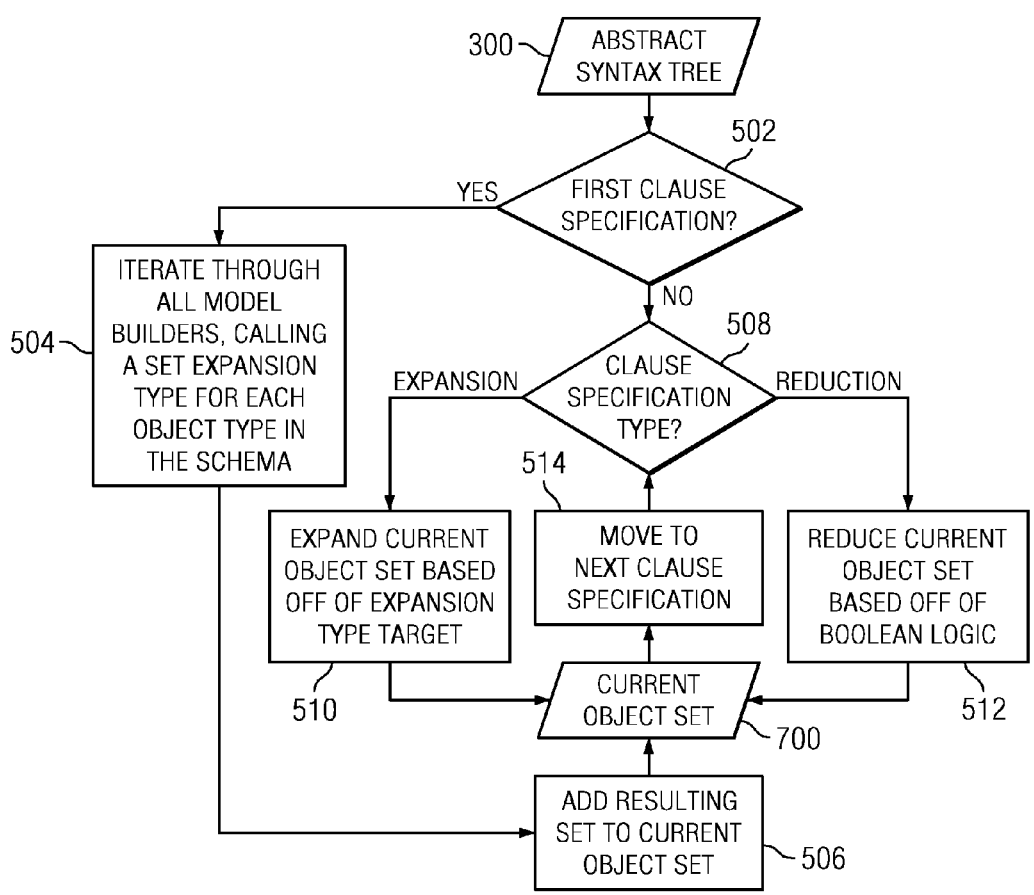
FIG. 5 illustrates the processing steps of the query processor.

FIG. 5 illustrates the query processor operation. As noted above, the query processor takes as an input the abstract syntax tree generated by the compiler. A test is performed at step 502 to determine whether first clause specification is to be processed. If so, the routine branches to step 504. At this step, the query processor iterates through all model builders, calling a set expansion for each object type in the object schema (as will be described below). At step 506, a result set is added to a current object set 700. If, however, the result of the test at step 502 is negative, a test 508 is performed to determine the clause specification type (as the processing is now being performed within a given clause pipeline). If the clause specification type is expansion, the routine branches to step 510 to expand the current object set based off of an expansion target type. This step calls a set expansion from the model builder that provides expansion type source. The output of step 510 is provided to the current object set 700. If the clause specification type is reduction, however, the routine branches to step 512 to reduce the current object set based off of given Boolean logic. The routine then moves to a next clause specification at step 514 and the process iterates until all clause specifications in the query are processed. At the conclusion of the clause definition processing, a set of objects is produced. If there is more than one clause definition in the query the user may specify standard mathematical set operations to be applied between the ordered sets, and these operations may include union, intersection, and compliment (or "subtraction"). A single final object set is constructed from all set operations applied to the object sets produced from each clause definition.

As noted above, one or more builder programs within the system (each referred to as a "model builder") are used internally to present data models to the query processor of the system. A model builder extracts data from a given type of data source, and it enables that data to be presented to one or more constructs of the search language according to a single unified data model. Thus, the model builder functions as an abstraction layer, which can be used to introduce new objects, relationships and properties to the search mechanism without modifying the search language itself.

Figures 6, 7:
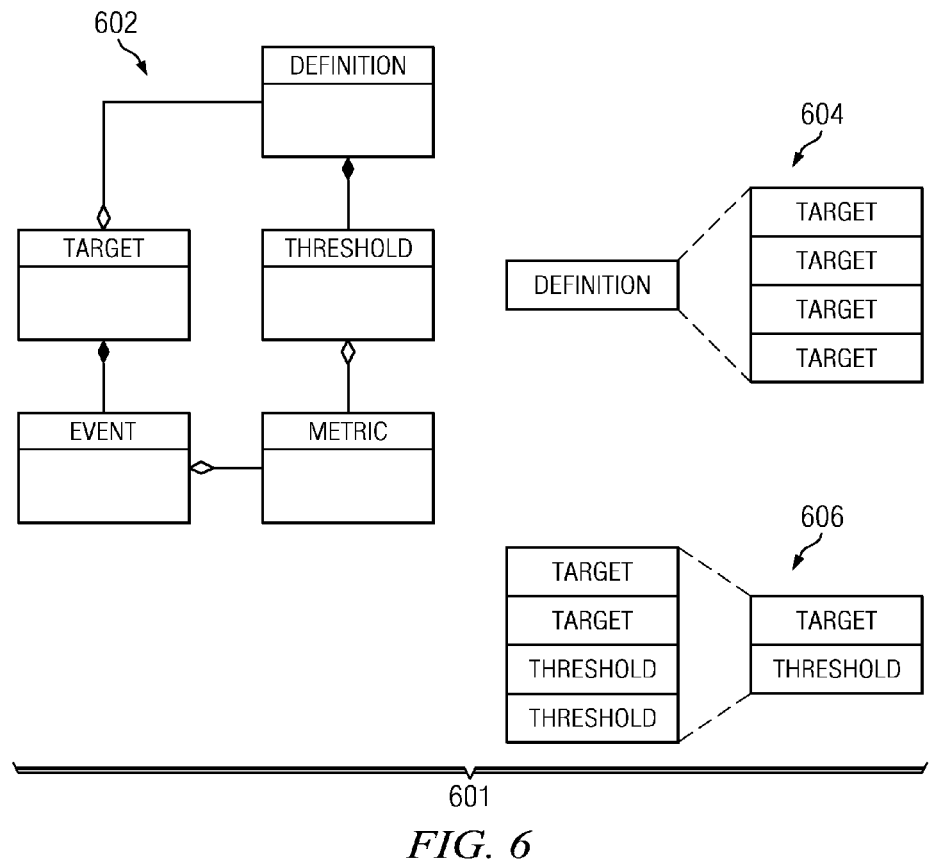
FIG. 6 illustrates components of a model builder object.
FIG. 7 is an example of an HTTP-based query entity making a request to the query system and the results returned from that request.

Referring now to FIG. 6, a model builder object 601 is characterized by one or more of the following: an object schema 602, a set expansion 604 and a set reduction 606. The properties of an object are provided by the object schema 602, and a representative schema is illustrated using a UML-based model. A set expansion 604 produces a set of new objects based off of a source object. A set reduction filters a superset of objects down to a smaller set based off of given filter criteria. The objects in an object set pipeline are provided by an underlying system of model builders. Thus, a given model builder provides the query processor with an object schema, object set expansions, and object set reductions. The expansion specifications are defined in more detail below in the "Parse Constructs" section.

Advantageously, and as noted above, the model builders provide this data to the search language constructs in a single unified data model. In an IT infrastructure environment, the object types constitute generalized IT objects. Examples of object types include, but are not limited to: virtual machines, physical hosts, groups of systems, clusters, network interfaces, switches, software, processes, protocols, memory, CPUs, system events, storage, files, and networks. Of course, these examples are merely illustrative, and the object type of course will vary depending on the implementation environment.

A model builder thus provides primitive data objects to the query processor. A model builder obtains data from a data source and generates a data model. As noted, a data source may be one of: a historical database, an on-demand data source accessed via an API, a streaming data source, or the like. The models are used during the processing by the query processor of the abstract syntax tree, which is generated as an output from the compiler (which receives as input tokens produced from lexical analysis of the query string).

The boundary between the query processor and a model builder conforms to a well-defined interface. As noted above, this interface ensures that a model builder provides the query processor with a heterogeneous object schema, object set expansions based on expansion specifications, and object set reductions based off of filters. As noted above, an object set expansion produces a set of new objects based off a source object. For example, the query vm.name=foo project_vnic may expand a set of one vm object to a set of more than one vnic objects. In this case, the query processor calls on the model builder provided object set explanation function and preferably passes in an instance of a vm object; the model builder expands that object to a set of vnic objects, which set is then returned to the query processor. In contrast, an example object set reduction simply filters a superset of objects down to a smaller set based on a given filter criteria. Continuing with this example, if the current object set comprises of vm objects and each has a mem (memory) property, a clause specification of vm.mem>2048 would filter out any vm objects whose mem properties were less than or equal to 2048; thus, an object set reduction would produce a reduced set of objects from the original set. In this case, the query processor preferably passes in the filter vm.mem<2048 to the model builder provided set reduction function. This method then returns a subset of the vm objects that were passed into the method call.

As these examples illustrate, the query processor maps the different heterogeneous object schemas together from multiple model builders to provide a single unified query interface, even from potentially heterogeneous data storage systems.

As another concrete example, consider the query vm.name=foo project cpu_perf at 1 week ago. This query uses two different model builders. The first model builder uses a historical SQL-based database system, and the second model builder uses a SOAP based API. Using the techniques described herein, the query processor has integrated the two different heterogeneous object types into a single unified object model. In particular, the query processor deduces that the vm object type is provided by the historical database system and delegates the filtering of the vm object named foo to it. The query processor then deduces that the cpu_perf object type is provided by the second model builder. Once the vm object is returned by the first model builder, it is then passed in conjunction with a time specification as filter parameters to the second model builder, thereby producing a resulting cpu_perf object.

When the query processor concludes the execution of a query, the processor returns to the query entity the current object set (as illustrated in FIG. 5). Several different types of object interchange formats can be used to return the resulting data objects including, without limitation, JSON, YAML, XML, .Net, Java, or Google Protocol Buffers. The output of the query can be used by any existing procedural language to conduct any further operations on the data, such as auto-response capabilities. FIG. 7 is an example of an HTTP-based query entity making a request and the results returned from that request.

Figure 8:
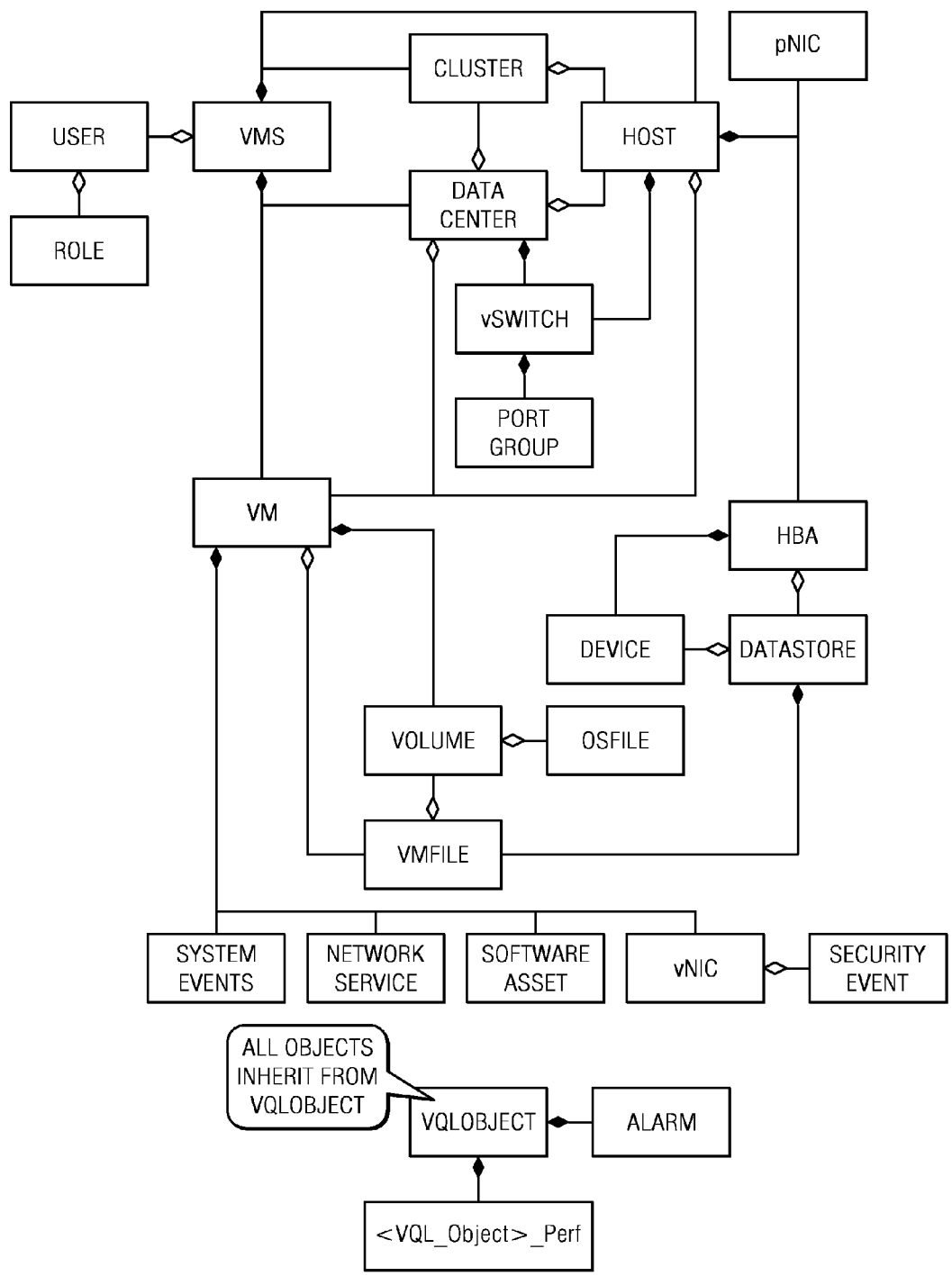
FIG. 8 is a UML-based model of a unified type model generated from different model builders.
Figure 9:
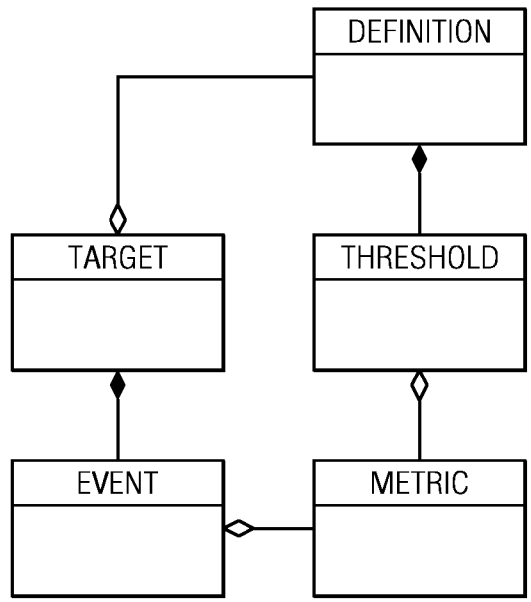
FIG. 9 is a representative UML-based model of an IT infrastructure that is generated by a model builder.
Figure 10:
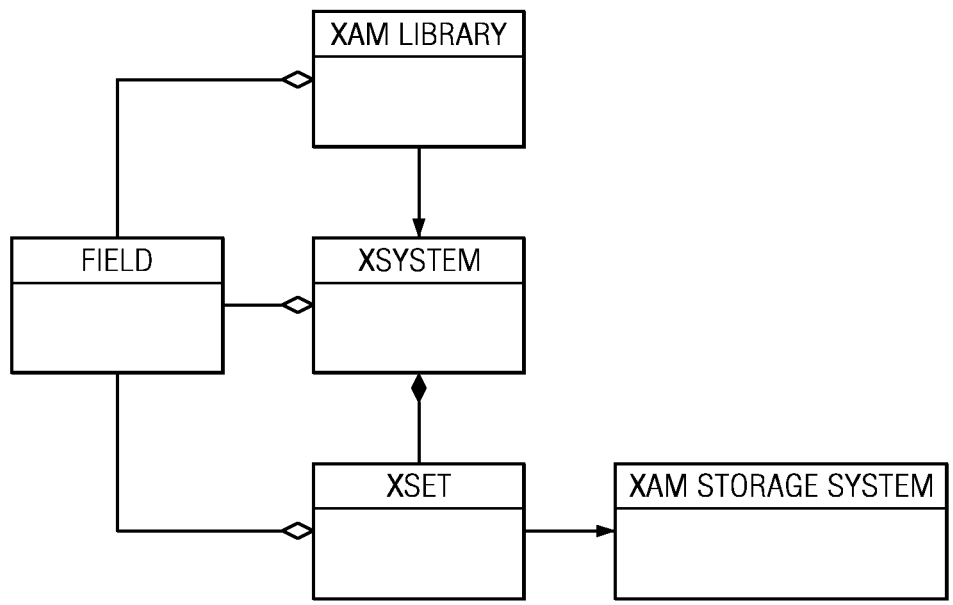
FIG. 10 is a representative UML-based model of a streaming performance data model that is generated by a model builder.

FIG. 8 is a UML-based model of a unified type model generated from different model builders. FIG. 9 is a representative UML-based model of an IT infrastructure that is generated by a model builder. FIG. 10 is a representative UML-based model of a streaming performance data model that is generated by a model builder.

FIG. 11 is a set of representative examples of requests for desired information and, for each request, the query string that is used to generate the desired results using the techniques described herein.

The various components (e.g., compiler, query processor, model builder) typically are implemented as one or more computer programs, where a computer program is a set of computer program instructions stored in a computer memory or data store and adapted to be executed by one or more processors to perform a process or method having a set of functions or operation steps. As noted above, a model builder extracts data from any type of data source, such as a relational database system (RDBMS) or an application programming interface (API). By providing the model builder abstraction layer, the language itself can query data in several different heterogeneous data storage systems, and it can then provide any type of dictionary of objects and properties. Using this abstraction, the model builder can introduce new objects, relationships, and properties without modifying the language structure itself. In addition, the model builder can query a single relational database system and the contents of that database can include data from multiple heterogeneous systems.

Model builders can provide data from any data source. Preferably, querying a model builder not only queries factual data but can also query correlated information, as well as logically-derived information at the time of query execution from a data source. For example, a model builder can store the fact that virtual network interface A is on VLAN 12 and virtual network interface B is on VLAN 12. A model builder can correlate those two facts into a new primitive property that has a relationship with both virtual machines. The model builder can present this new property to the language without requiring a change to the language.

Moreover, because model builders can derive new properties and objects based on factual data, model builders themselves can create new language properties and objects based on persisted state within a source data structure. For example, a model builder can provide a named property on a virtual machine object if there is data within the source data store that provides evidence that the virtual machine was connected to an insecure network in the past.

As noted above, object relationships either can be encoded as facts in the underlying model, or they can be derived from facts within the model builder itself. Expansion operations in the query remove the complexity of object navigation by using the object schema provided by model builders to traverse an abstract syntax tree for desired objects. Filtering operations in the query use standard grouping Boolean logic for object property comparisons. Preferably, the language need include any type information for objects but instead provides operators that the model builders map to native object type operations to produce results.

When a user issues an on-demand query to the query system, the model builders preferably distribute the processing of the query across multiple data processing engines for the purpose of data correlation and improving query performance. Moreover, because model builders can provide data from any data source, the system can also provide query specifications to a model builder that processes streaming data (as opposed to mere static data or data that is retrieved on-demand). Thus, the language can specify a single query across multiple model builders to simultaneously provide query results from a static model builder, a dynamic model builder, and a streaming model builder. In this way, and as has been described, the system correlates data from multiple data sources.

Because model builders provide most of the breadth of the language, the set of tokens that constitute the language itself is fairly small. To provide natural language query simplicity, the language considers unrecognized tokens as string query specifications for the string versions of all object properties within the universe of the current clause specification the token was found in.

A query processor that implements the language comprises a parser, a lexical analyzer, an abstract syntax tree, and one or more model builders as well as model builders to different types of data storage systems providing high performance pipeline selection logic of disparate objects and properties.

As illustrated in FIG. 2, the execution of the query processor may or may not occur within the process space of a model builder. In appropriate circumstances, it may be desirable to implement remote execution of the query processor to improve query performance over local-process execution. In addition, the language formatting is not line terminated and preferably uses keywords, spacing, and identifiers suitable for UTF-8 encoding in URLs.

Grammar

A context-free grammar for the language is described below. As noted above, the compiler performs lexical analysis of a query string based off a set of lexical constructs. This lexical analysis produces a set of tokens that are then parsed to produce the abstract syntax tree. These constructs are set forth below:

Lexigraphical Constructs

```
LOGICAL_CONDITIONAL ::= 'AND' | 'OR'
EXPANSION ::= 'PROJECT' | 'EXPAND'
SET_OPERATION ::= 'INCLUDE' | 'IN' | 'WITHOUT'
BOOLEAN ::= 'true' | 'false'
IS ::= 'IS'
AT ::= 'AT'
AGO ::= 'AGO'
NOT ::= 'NOT' | '!'
```

-continued

```
BETWEEN ::= 'BETWEEN'
THRU ::= 'THRU'
EMPTY ::= 'EMPTY'
STARTSWITH ::= 'STARTSWITH'
ENDSWITH ::= 'ENDSWITH'
CONTAINS ::= 'CONTAINS'
REGEX ::= 'REGEX'
GREATER ::= 'GREATER'
LESS ::= 'LESS'
THAN ::= 'THAN'
EQUALS ::= 'EQUALS'
LEFT_PAREN ::= '('
RIGHT_PAREN ::= ')'
PIPELINE ::= '|'
OBJECT_DELIMITER ::= '.'
COLON ::= ':'
DASH ::= '-'
SIMPLE_PROPERTY_OP ::= '=' | '!=' | '>' | '>=' | '<' | '<=' |
        CONTAINS        |
        STARTSWITH      |
        ENDSWITH        |
        REGEX           |
        NOT? EQUAL      |
        GREATER THAN EQUAL? |
        LESS THAN EQUAL?
IS_PROPERTY_OP ::= IS NOT?
UPPER ::= 'A' .. 'Z'
LOWER ::= 'a' .. 'z'
LETTER ::= UPPER | LOWER
DIGIT ::= '0' .. '9'
SPACE ::= ' ' | '\t'
SINGLE_QUOTE ::= '\''
DOUBLE_QUOTE ::= '"'
NUMBER ::= DASH? DIGIT+
WORD ::= LETTER (LETTER | DIGIT | '_')*
SINGLE_QUOTE_STRING ::= SINGLE_QUOTE (~SINGLE_QUOTE) * SINGLE_QUOTE
DOUBLE_QUOTE_STRING ::= DOUBLE_QUOTE (~DOUBLE_QUOTE) * DOUBLE_QUOTE
STRING_LITERAL = SINGLE_QUOTE_STRING | DOUBLE_QUOTE_STRING
TIME_INTERVAL ::= WORD // allow for minute, minutes, min, etc
```

Parse Constructs

The following is a set of parsing constructs (described according to BNF, an industry standard grammar) that are implemented by the parser. Preferably, a search query is composed of an ordered set of clause definitions, and each clause can have set membership operations applied to it. Each clause includes a clause pipeline, and a time constraint. A clause pipeline includes an ordered set of clause specifications separated by a pipeline operator. A clause specification can be either an expansion operation or a filtering operation. Preferably, a first clause specification in a pipeline operates on an initial universe of all objects, and each subsequent clause specification operates on a set of objects produced from the previous clause specification.

An expansion specification uses the object schema provided by the model builder to navigate to specific information the user desires without requiring the user to understand the relationships between all object relationships. As noted above, this technique minimizes query specification size and reduces complexity. Preferably, there are two types of expansion mechanisms defined: "project" and "expand." Clause specifications are pipelined together, meaning that the objects from a previous clause specification are used as input to a subsequent clause specification. If the previous objects are used to produce the subsequent set but are not included, the keyword "project" is used. If the user wishes to include the previous objects into the new set of objects, then the user specifies the "expand" keyword.

Another advantageous capability of the language is the inclusion of temporal specification within clause definitions. There are two primary methods for time specification. The first uses the keyword "at," and the second uses the keywords "between" and "thru." Certain types of data can exist across a span of time. An example of this type of data is the running state of a virtual machine, e.g., the virtual machine ran from time A to time B. In these instances, the keyword "at" is used to denote a specific place within that span of time. Other types of data exist only at a particular instance of time as opposed to a time span. An example of that type of data is a particular event, such as an alarm which occurred at an exact time. Thus, a time span is used to include that type of data using the keywords between and thru.

The subject matter disclosed herein and described above provides many advantages. The disclosed language differs from prior art techniques and existing languages by simultaneously allowing both natural language search and a relationship-driven structured search to be used within a single query specification on a unified data model. In addition, the language also adds two other major differences from existing languages. The language provides for the codification of time in query terms, thereby allowing users to limit query results based off of object property relationships, for example, using instances or ranges of time. The described subject matter also can take advantage of set membership capabilities, including query result unions, intersections, and subtractions.

QUERY::=CLAUSE_DEFINITION (SET_OPERATION CLAUSE_DEFINITION)*
CLAUSE_DEFINITION::=CLAUSE_PIPELINE CLAUSE_TIME_SPEC)*
CLAUSE_PIPELINE::=CLAUSE_SPEC (PIPELINE CLAUSE_SPEC)*

CLAUSE_SPEC::=EXPANSION_SPEC|FILTER_SPEC EXPANSION_SPEC?
EXPANSION_SPEC::=EXPANSION WORD (COLON NUMBER)?
FILTER_SPEC::=NOT? PROPERTY_FILTER_SPEC (LOGICAL_CONDITIONAL? PROPERTY_FILTER_SPEC)*
PROPERTY_FILTER_SPEC::=PROPERTY_SPEC|LEFT_PAREN FILTER_SPEC RIGHT_PAREN PROPERTY_SPEC::=

// [object.]property[.property] . . . op value
    OBJECT_SPECIFIER? PROPERTY_SPECIFIER SIMPLE_PROPERTY_OP SIMPLE_PROPERTY_VALUE|
    OBJECT_SPECIFIER? PROPERTY_SPECIFIER IS_PROPERTY_OP ASSERTION_PROPRETY_VALUE|
    OBJECT_SPECIFIER? PROPERTY_SPECIFIER SIMPLE_PROPERTY_OP DATE_PROPERTY_VALUE|
    // really short cut, short cuts to object.property operator value
    SIMPLE_PROPERTY_VALUE OBJECT_SPECIFIER::=WORD
PROPERTY_SPECIFIER::=(OBJECT_DELIMITER WORD)+|WORD
ASSERTION_PROPERTY_VALUE::=EMPTY
SIMPLE_PROPERTY_VALUE::=WORD|STRING_LITERAL|BOOLEAN|NUMBER
DATE_PROPERTY_VALUE::=ABSOLUTE_TIME_SPEC|RELATIVE_TIME_SPEC
CLAUSE_TIME_SPEC::=AT ABSOLUTE_TIME_SPEC|
    AT RELATIVE_TIME_SPEC AGO|
    BETWEEN ABSOLUTE_TIME_SPEC THRU ABSOLUTE_TIME_SPEC|
    BETWEEN RELATIVE_TIME_SPEC AGO? THRU RELATIVE_TIME_SPEC AGO?
// YYYY-MM-DD HH:MM:SS
ABSOLUTE_TIME_SPEC::=NUMBER DASH NUMBER DASH NUMBER NUMBER COLON NUMBER COLON NUMBER
// X intervals
RELATIVE_TIME_SPEC::=NUMBER TIME_INTERVAL The subject matter disclosed herein and described above provides many advantages. The disclosed language differs from prior art techniques and existing languages by simultaneously allowing both natural language search and a relationship-driven structured search to be used within a single query specification on a unified data model. In addition, the language also adds two other major differences from existing languages. The language provides for the codification of time in query terms, thereby allowing users to limit query results based off of object property relationships, for example, using instances or ranges of time. The described subject matter also can take advantage of set membership capabilities, including query result unions, intersections, and subtractions.

The present invention provides for a data retrieval system from dissimilar computer software environments to a storage system of computer data. In order to interface the environments, a domain specific language is provided to map abstract data structures into different specific data types of varying composition into a format that is known and can be utilized by an application program. The language provides natural language expressions and default contextual type conversions to handle a full range of user based queries for IT infrastructure. The query system is composed of a compiler as well as model builders to different types of data storage systems providing high performance pipeline selection logic of disparate objects and properties.

The disclosed techniques provide the ability to produce query results based on the codification of IT infrastructure with complex relationships requiring minimal knowledge of the environment. As described, the invention combines both approaches of free-form search as well as structured search using a query based language grammar that executes at real-time speeds. The invention provides the ability to simplify query creation by providing natural language search capabilities where simple strings of characters can be used without specifying object relationships or special character delimiters or tokens. The language is able to use object relationships to produce more accurate query results whose results can be relied upon, even by unattended software automation. More generally, the techniques described herein provide for a single unified language construct that simplifies query processing.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 1) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the invention can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a readonly memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the parser, lexical analyzer and model builder components are implemented in a special purpose computer, preferably in software executed by one or more processors. The software is maintained in one or more data stores or memories associated with the one or more processors, and the software may be implemented as one or more computer programs. Collectively, this special-purpose hardware and software comprises a language processor that provides the described functionality.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The query mechanism may be any convenient client-side application, such as a web browser, a command line interface (CLI), a programmatic interface, or the like. As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. Further, while typically the client-server interactions occur using HTTP, this is not a limitation either. Any client-server interaction may be formatted to conform to the Simple Object Access Protocol (SOAP) and travel over HTTP (over the public Internet), FTP, or any other reliable transport mechanism may be used. Also, the term "web site" or "service provider" should be broadly construed to cover a web site (a set of linked web pages), a domain at a given web site or server, a trust domain associated with a server or set of servers, or the like. A "service provider domain" may include a web site or a portion of a web site. Any application or functionality described herein may be implemented as native code, by providing hooks into another application, by facilitating use of the mechanism as a plug-in, by linking to the mechanism, and the like.

Having described our invention, what we now claim is as follows.

What is claimed is:

1. A machine-implemented method of information retrieval, comprising:
   receiving, at a processing device, object-oriented data from multiple data sources;
   receiving, at the processing device, a query from a query application that formulates the query and supplies the query to an information retrieval system, wherein the query application is not part of the information retrieval system, the query comprising an ordered set of clause definitions each comprising a clause pipeline and a time constraint,
     wherein the clause pipeline comprises an ordered set of clause specifications that comprises: an expansion operation and/or a filter operation,
     wherein a first clause specification in the clause pipeline operates on an initial set of objects of the object-oriented data, and each subsequent clause specification in the clause pipeline operates on one or more objects that is produced from a respective previous clause specification that is executed directly before the subsequent clause specification within the ordered set of clause specifications,
   parsing, at the processing device, the query into a graph of data nodes;
   processing, at the processing device, the data nodes in the graph on the object-oriented data to generate a current object set, wherein each data node is processed using a data model generated by a model builder component, the model builder component obtaining data for the data model from a given data source of the multiple data sources; and
   returning, at the processing device, the current object set to the query application in response to the query.

2. The method as described in claim 1 wherein the expansion operation produces a set of objects from a given object from the object oriented data.

3. The method as described in claim 1 wherein the filter operation filters a set of objects to a reduced set of objects.

4. The method as described in claim 1 wherein multiple data models are generated by model builder components, and the data models generated by the model builder components are mapped to a unified data model across all model builder components.

5. The method as described in claim 1 wherein the query uses multiple model builder components to provide the current object set, wherein the multiple model builder components are one of: a model builder of static data, a model builder of dynamic data, and a model builder of streaming data.

6. The method as described in claim 1 wherein the given data source comprises: a relational database, an application programming interface, or any data source that produces objects; or any combination thereof.

7. The method as described in claim 1 wherein the query application comprises a monitoring tool for an IT infrastructure.

8. A system, comprising:
   a processing device; and
   a computer memory holding computer instructions for information retrieval, the instructions comprising:
   receiving, at a processing device, object-oriented data from multiple data sources;
   receiving, at the processing device, a query from a query application that formulates the query and supplies the query to an information retrieval system, wherein the query application is not part of the information retrieval system, the query comprising an ordered set of clause definitions each comprising a clause pipeline and a time constraint, wherein the clause pipeline comprises an ordered set of clause specifications that comprises: an expansion operation and/or a filter operation, wherein a first clause specification in the clause pipeline operates on an initial set of objects of the object-oriented data, and each subsequent clause specification in the clause pipeline operates on one or more objects that is produced from a respective previous clause specification that is executed directly before the subsequent clause specification within the ordered set of clause specifications, parsing, at the processing device, the query into a graph of data nodes;

processing, at the processing device, the data nodes in the graph on the object-oriented data to generate a current object set, wherein each data node is processed using a data model generated by a model builder component, the model builder component obtaining data for the data model from a given data source of the multiple data sources; and returning, at the processing device, the current object set to the query application in response to the query.

9. The system of claim 8 wherein multiple data models are generated by model builder components, wherein the data models generated by the model builder components are mapped to a unified data model across all model builder components.

10. The system of claim 8 wherein the expansion operation produces a set of objects from a given object from the object oriented data.

11. The system of claim 8 wherein the filter operation filters a set of objects to a reduced set of objects.

12. The system of claim 8 wherein the query uses multiple model builder components to provide the current object set, wherein the multiple model builder components are one of: a model builder of static data, a model builder of dynamic data, and a model builder of streaming data.

13. The system of claim 8 wherein the given data source comprises a relational database, an application programming interface, or any data source that produces objects; or any combination thereof.

14. The system of claim 8 wherein the query application comprises a monitoring tool for an IT infrastructure.

\* \* \* \* \*